Oct. 23, 1951 M. GLIWA 2,572,134
AIRPLANE RUDDER
Filed June 10, 1946

INVENTOR.
Michael Gliwa

UNITED STATES PATENT OFFICE 2,572,134

AIRPLANE RUDDER

Michael Gliwa, Chicago, Ill.

Application June 10, 1946, Serial No. 675,607

1 Claim. (Cl. 244—87)

The present invention relates to airplane rudders and has for its main object the provision of a rudder of a novel construction and of an efficient operation for steering the airplane in a horizontal plane.

A still further object of the present invention is the provision of a suitable mounting means for an airplane rudder, on the nose of an airplane, or rear end thereof.

With the above general objects in view and others that will appear as the invention is better understood, the same consists in the novel construction, combination and arrangement of parts hereinafter more fully described, illustrated in the accompanying drawing and pointed out in the appended claim.

In the drawing forming a part of this application and in which like designating characters refer to corresponding parts throughout the several views.

Figure 1:
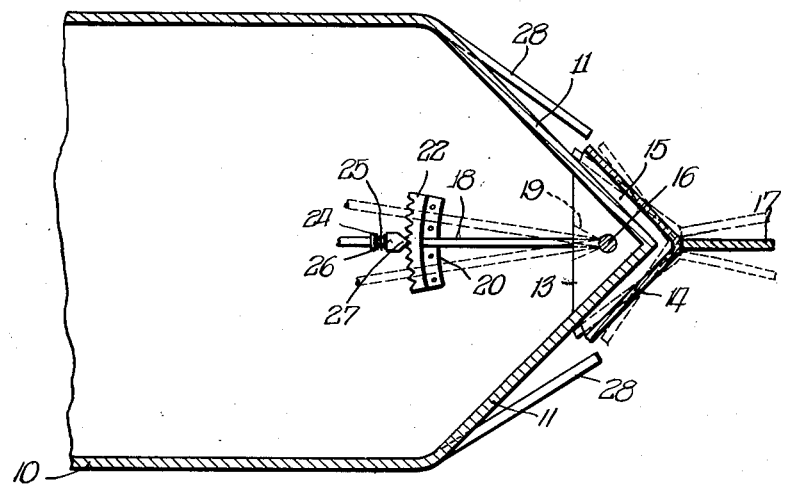
Fig. 1 is a cross-sectional view, on horizontal plane, through an end of an airplane, either front or rear.
Figure 2:
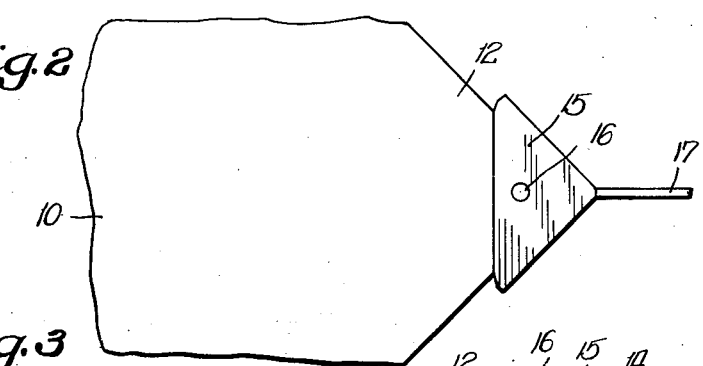
Fig. 2 is a fragmentary top elevational view of an airplane end with the present device in an operative position.
Figure 3:
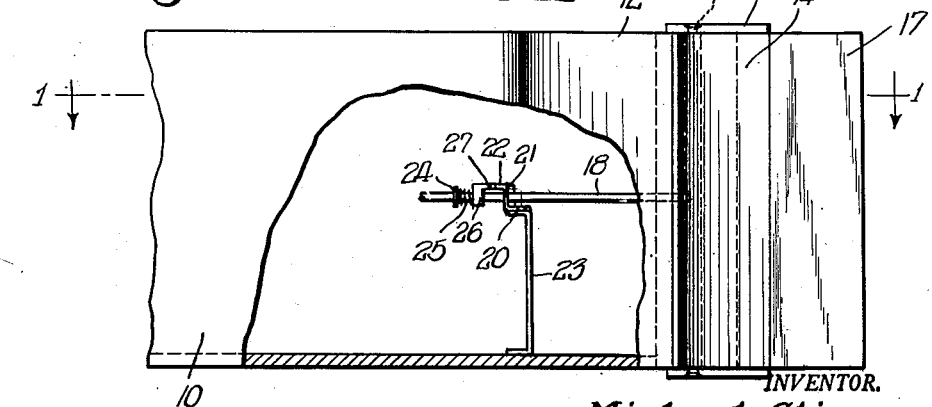
Fig. 3 is a side elevational view of an airplane, with the rudder in position therewith, with one side of the fuselage broken away, illustrating the steering mechanism of the rudder.

Referring in detail to the present drawing there is shown an airplane fuselage 10, with the side walls of which inclined walls 11 rigidly connect for forming nose 12, which may be either at the front or rear end of the fuselage, depending on the end at which it is desired to place the rudder herein disclosed.

Positioned within the apex of said inclined walls 11, and rigidly affixed thereto in any suitable manner is bearing member 13 which is of a triangular formation on a transverse cross-section. Said bearing member 13 extends to the top and bottom walls of fuselage 10 and may be likewise rigidly attached thereto.

The rudder includes a pair of vertically, angularly disposed plates 14, which are rigidly connected along one of their vertical edges. Rigidly connecting with the top and bottom ends of said plates 14 are top and bottom plates 15, the latter overlying the outer faces of top and bottom walls of the fuselage within nose 12.

Extending longitudinally of said bearing member 13 is rockpost 16, the ends of which rigidly connect with plates 15.

Rigidly connecting with the apex formed by plates 14 is rudder plane 17.

Rigidly connecting with rock-post 16 is steering bar 18, which extends through an angular slot 19 made in said bearing member 13. The free end of said steering bar 18 is supported upon plate 20, and is passed through a longitudinal horizontal slot made in the vertical extension 21 of said plate 20. Integrally formed and horizontally extending from said extension 12 is toothed plate 22, below which said steering bar 18 is adapted for angular shifting movement on horizontal plane, as is indicated by dotted lines in Fig. 1. Said plates 20 and 22 are supported by standards 23 rigidly affixed to the floor of fuselage 10. Rigidly affixed to said steering bar 18 is collar 24 against which coil spring 25, set upon said steering bar 18, bears. Positioned adjacent the opposite end of said coil spring 25 is collar 26 having projection 27 which is adapted to engage teeth upon plate 22, said projection 27 being urged to said plate 22 by said coil spring 25.

From the hereinabove description it will be seen that through the medium of said projection 27 steering bar 18 may be locked to said plate 22 so as to maintain the same in a shifted, adjusted position, as is seen in Fig. 1. Said projection 27, however, will not interfere with angular shifting of said steering bar 18 in either direction, because, when manual pressure is applied to the outer free extremity of said steering bar 18 the same will shift against the action of projection 27, the latter simply riding upon teeth in plate 22.

As steering bar 18 is shifted to either direction, rockpost 16 will be caused to make rotary shifting movement, thereby angularly shifting plates 15, with which said rock-post 16 rigidly connects as stated. With the shifting of said plates 15, plates 14 will likewise shift, and with the latter rudder plane 17 will shift in either direction, as is indicated by dotted lines in Fig. 1, for steering airplane in a horizontal plane.

It is further observed that when steering bar 18, and consequently rudder plane 17, are in neutral position as is shown by full lines in Fig. 1, plates 14 will remain in a spaced, parallel relation with inclined walls 11. By virtue of this arrangement there is sufficient play for plates 14 to shift towards or away from inclined walls 11 for shifting rudder plane 17.

If the rudder is placed rearwardly of the fuselage, for the purpose of deflecting air from coming into the passage defined by plates 14 and incline walls 11, plates 28 are rigidly affixed to said incline walls 11 approximately at the point of juncture of the latter with the side walls of fuselage 10.

If, however, the rudder is used forwardly of fuselage 10, in that event air deflecting plates 28 may be entirely eliminated.

While there is described herein preferred embodiments of the present invention, it is nevertheless to be understood that minor changes may be made therein without departing from the spirit and scope of the invention as claimed.

What I claim as new is:

In an airplane, including a fuselage having at the rear end thereof a pair of diverging end walls connected at their inner ends, said ends defining a corner, a rudder device comprising a bearing mounted within said corner, a trough-like member disposed adjacent said corner and having the sides thereof respectively in a spaced substantially parallel relation with the adjacent end walls in a medial position of the rudder device, said trough-like member including a pair of horizontal end plates and a pair of connected vertical plates forming the sides thereof, a rockpost journaled within said bearing, the ends of said rockpost being rigidly connected with said horizontal end plates, a rudder plane rigidly connected with said vertical plates substantially at the juncture thereof, and means for rocking said rockpost for angularly shifting said rudder plane horizontally, and air deflecting plates extending from said diverging end walls, the free ends of said air deflecting plates being substantially in alignment with the free edges of said vertical plates in their medial position.

MICHAEL GLIWA.

REFERENCES CITED

The following references are of record in the file of this patent:

UNITED STATES PATENTS

| Number | Name | Date |
|---|---|---|
| 540,628 | Bothwell | June 11, 1895 |
| 1,754,571 | Podolsky | Apr. 15, 1930 |

FOREIGN PATENTS

| Number | Country | Date |
|---|---|---|
| 37,356 | France | Aug. 5, 1930 |
| (1st Addition to No. 666,715) | | |